United States Patent [19]

Guadalajara de la Fuente

[11] 3,915,127

[45] Oct. 28, 1975

[54] COMBINED CARBURETOR AND FEEDER MEANS FOR AN INTERNAL COMBUSTINE ENGINE

[76] Inventor: Manuel Guadalajara de la Fuente, Hermosilla 87, Madrid, Spain

[22] Filed: Dec. 17, 1973

[21] Appl. No.: 425,644

Related U.S. Application Data

[62] Division of Ser. No. 221,949, Jan. 31, 1972, Pat. No. 3,814,067.

[30] Foreign Application Priority Data

Feb. 8, 1971  Spain .................................... 388072
Jan. 24, 1972  Spain .................................... 399152

[52] U.S. Cl. ........ 123/32 ST; 123/32 SP; 261/23 A
[51] Int. Cl.² .......................................... F02B 3/00
[58] Field of Search ........ 261/23 A, 34 A; 123/127, 123/7 TB, 32 ST, 38 SP, 32 C, 32 SW

[56] References Cited
UNITED STATES PATENTS

| | | | |
|---|---|---|---|
| 2,735,664 | 2/1956 | Gamble............................ | 261/23 A |
| 2,758,576 | 8/1956 | Schlamann...................... | 123/32 ST |
| 2,914,043 | 11/1959 | Nallinger......................... | 123/32 SP |
| 3,102,521 | 9/1963 | Slemmons....................... | 123/32 SP |
| 3,322,406 | 5/1967 | Marsee et al. ................... | 261/34 A |
| 3,439,658 | 4/1969 | Simonet .......................... | 123/32 ST |
| 3,659,564 | 5/1972 | Suzuki et al. ................... | 123/127 |
| 3,814,067 | 6/1974 | de la Fuente.................... | 123/32 SP |

Primary Examiner—Charles J. Myhre
Assistant Examiner—Paul Devinsky
Attorney, Agent, or Firm—Ladas, Parry, Von Gehr, Goldsmith & Deschamps

[57] ABSTRACT

A combined carburetor and feeder means for an internal combustion engine combustion chamber having a principal combustion and a precombustion chamber wherein a carburetor is adapted to provide separate supplies of air/fuel mixture to said principal and precombustion chambers and to provide individual qualitative control of the air/fuel mixture of each said supply; the carburetor including a float chamber; a group of diffusers by way of which said supply of air/fuel mixture for said principal chamber is furnished; a depression sound; a regulator means adapted to regulate flow of fuel from said float chamber to said group of diffusers; a closure valve means attached to said regulator means for operation therewith; said depression sound having an intake located between said group of diffusers and emerging adjacent said closure valve, said closure valve controlling air flow from said depression sound; and means for supplying fuel from said float chamber to be mixed with air flowing from said depression sound past said closure valve to provide said supply of air/fuel mixture for said precombustion chamber. The feeder means being arranged to control supply of mixture to the precombustion chamber to a desired time period during the operational cycle of said engine.

8 Claims, 22 Drawing Figures

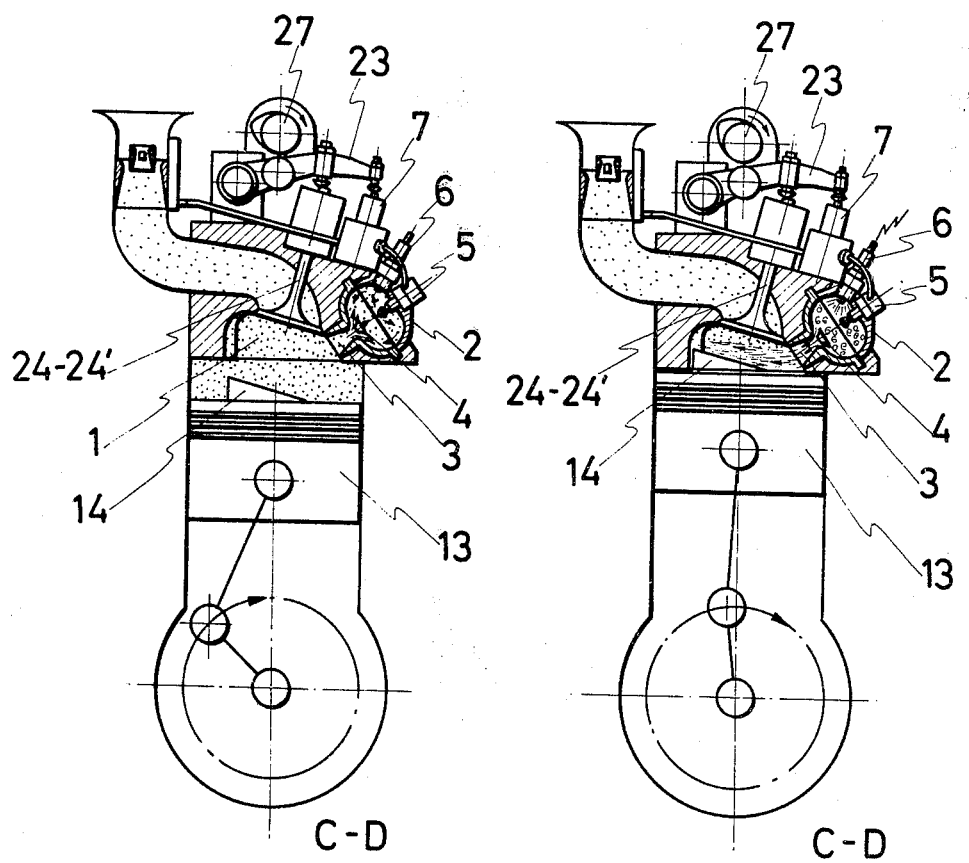

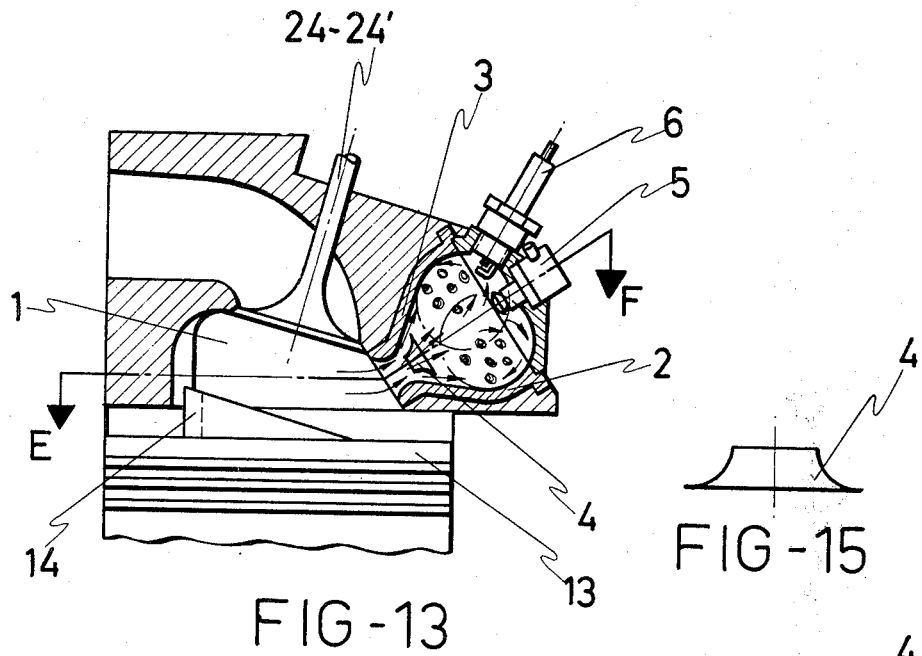
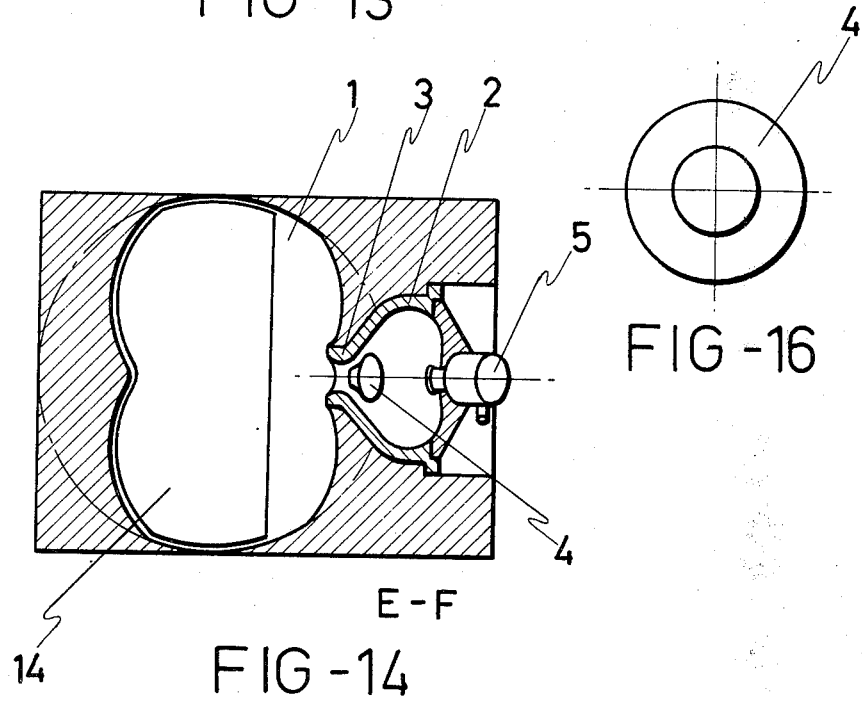

Figure 17:
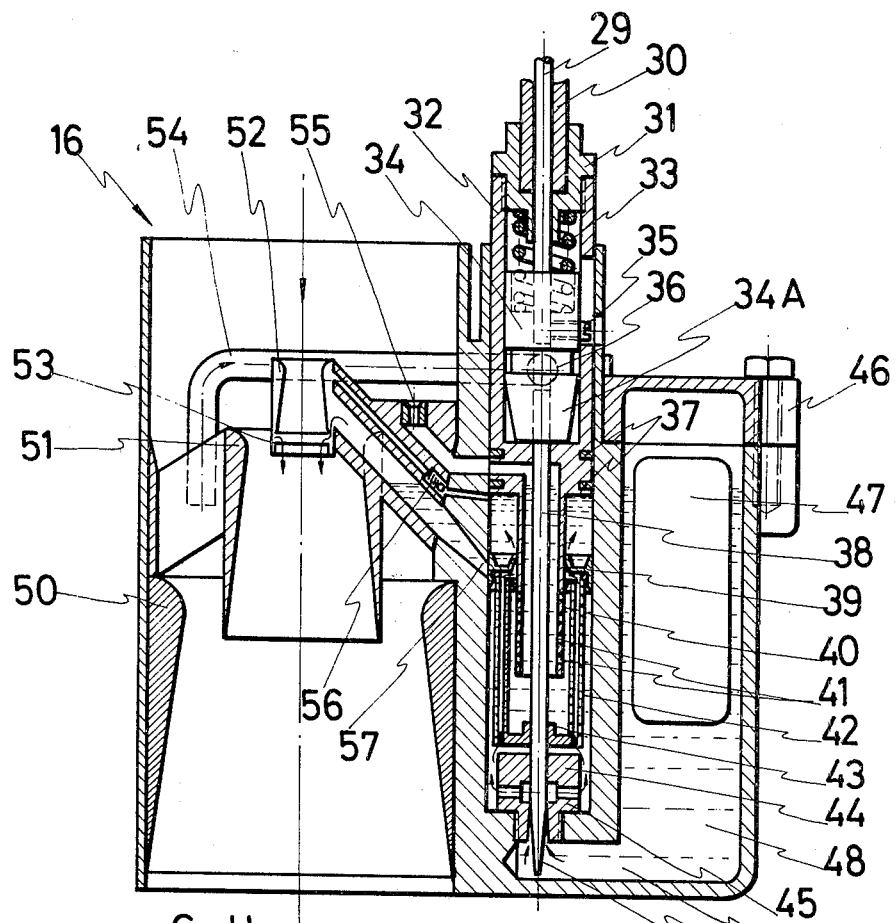

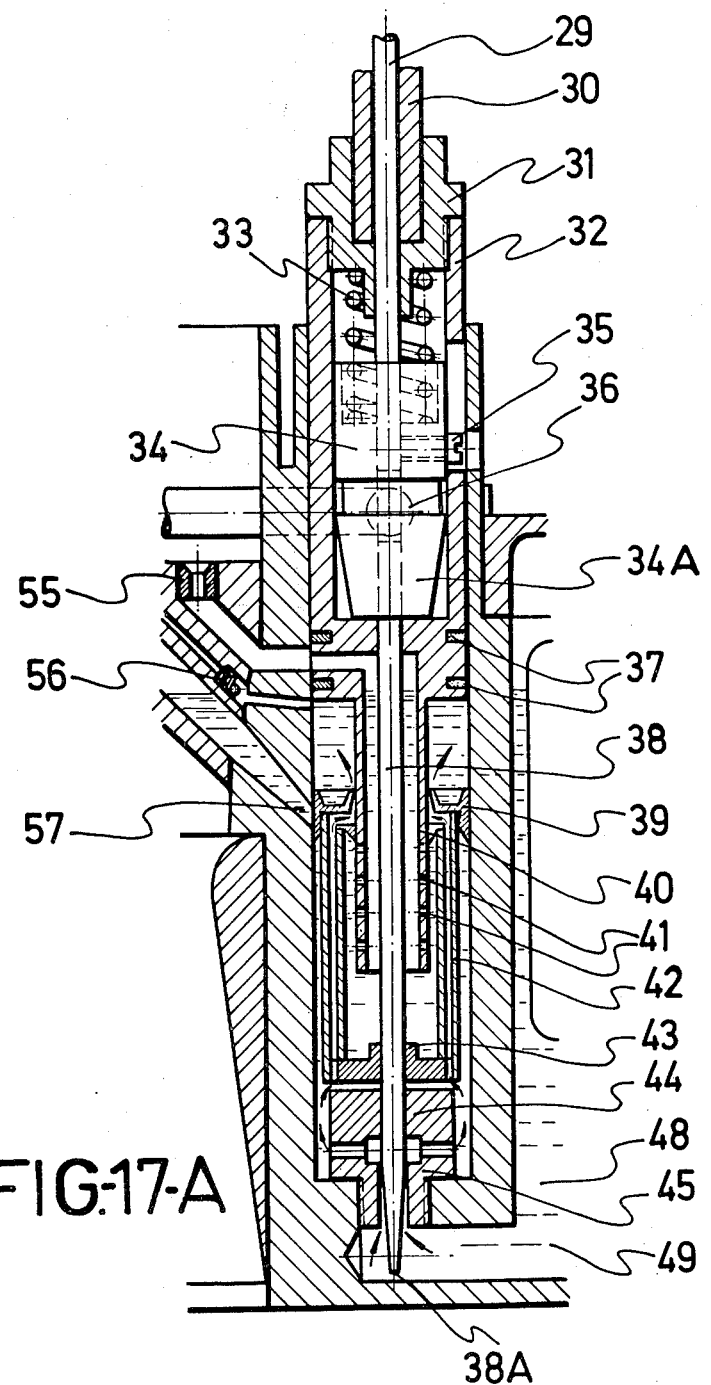
FIG.17-A

COMBINED CARBURETOR AND FEEDER MEANS FOR AN INTERNAL COMBUSTINE ENGINE

This is a division, of application Ser. No. 221,949 filed Jan. 31, 1972, now U.S. Pat. No. 3,814,067.

This invention relates to an ignition system to be utilized in internal combustion engines having two compression chambers; a main and a secondary or precombustion chamber. The system enables air/fuel ratio to vary depending on engine speed.

In an engine propelled under said minimum speed control, the stated air/fuel ratio must necessarily be on the order of 5 to 8 times above the stoichiometric or chemically appropriate ratio (a factor coinciding with excess air coefficient) employed in quantitative control. That is, at minimum speed only a fraction of the total of compressed air participate in combustion or, similarly, it can burn mixtures extremely poor in fuel as is the case in Dr. Rudolf Diesel's reduced load fuel cycle.

In the small secondary or precombustion chamber located in the cylinder head in certain qualitative control engines, fuel was injected at the end of the compression cycle. The high pressure occasioned by combustion in the precombustion chamber impelled the burning gases through a constricted neck to the interior of the cylinder where combustion ignites the mixture in the principal chamber.

However, despite the fact that provision of the precombustion chamber caused a more perfect burning of the mixture in the principal chamber, there were difficulties insofar as synchronizing and cost. In other words, synchronization of the qualities of the mixtures to the principal and precombustion chambers is difficult to resolve since engines having a chamber and precombustion chamber generally have airless carburetor and fuel injector per combustion chamber and this presupposes a markedly higher cost insofar as manufacture and maintenance of said devices. Further, as has been stated, mechanisms for synchronizing movement of the devices which are two per cylinder, in themselves constitute an insurmountable barrier.

For the above reasons these engines have not been industrially commercialized to date, serving merely for laboratory tests and research.

Another of the handicaps affecting said engines was the precombustion chamber which suffered from a number of technical drawbacks with regard to compression, since the shapes in which they were constructed were inadequate and did not enable close air/fuel mixing nor the necessary turbulence for ultrarapid combustion.

This invention resolves both drawbacks, since one only special effect dual carburetor feeds the chamber and precombustion chamber. In the latter a close air/fuel mixture takes place, precisely due to its revolving type torus provided with an aerodynamic nozzle section, there being located in the torus and nozzle axle a hollow truncated cone deflector with concave generators to produce dual fluid circulation and practically perfect mixture in the precombustion chamber.

The description of the invention under discussion is made with the help of the attached plans, on the basis of which the construction and operation of the system is stated, the aforementioned drawings are by way of non-restrictive example and complementary in order to establish the manner for adapting and operating the mentioned ignition system.

In the mentioned plans

Figure 1:
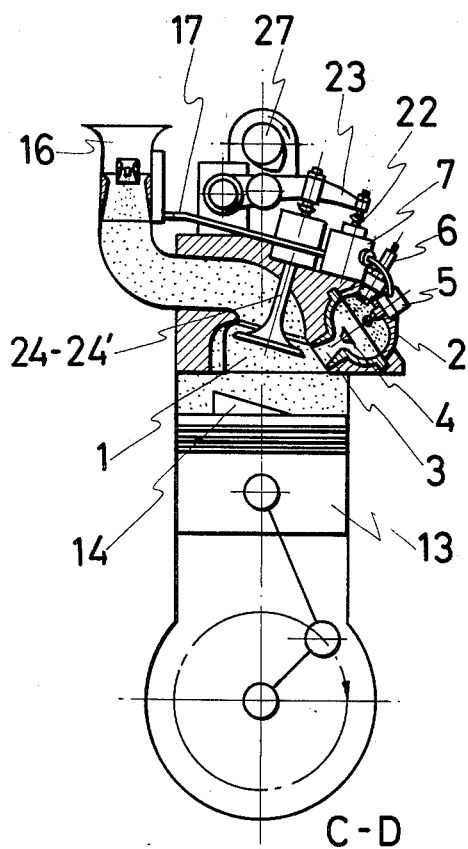

FIG. 1.- is a section of a single cylinder engine commencing its intake phase, according to the invention.

Figure 2:
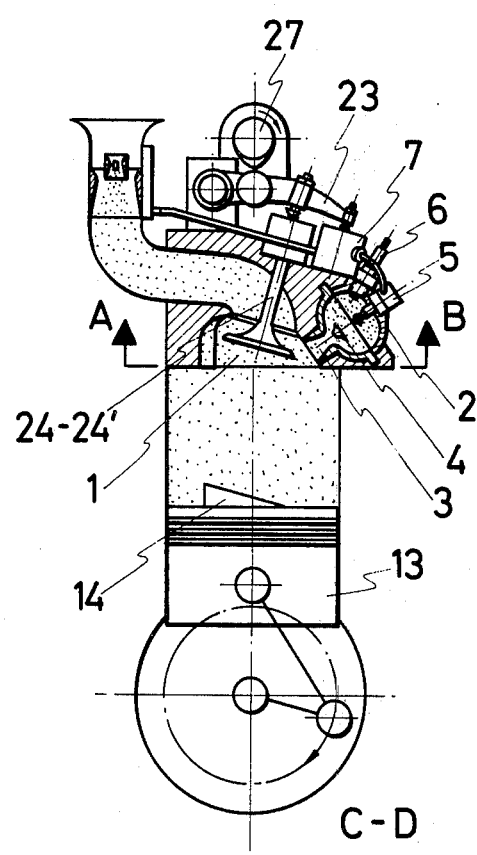

FIG. 2.- Section similar to that in the preceding section, with the piston in position approaching end of intake phase.

FIG. 3.- Section similar to the preceding ones with the piston in the position it occupies in the upward compression stroke near end of this phase.

FIG. 4.- Section similar to that in the foregoing figures showing engine at moment at which ignition of fuel mixture is initiated.

Figure 10:
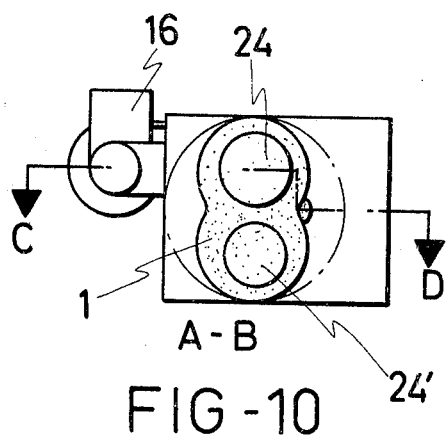

FIGS. 1 to 4 are taken from plan C-D in FIG. 10.

Figure 5:
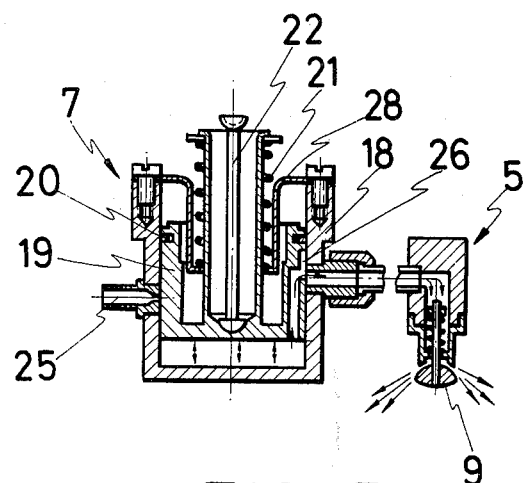

FIG. 5.- Longitudinal section of the device for feeding the mixture having an engine according to the invention. This will act in combination with the carburetor and is shown in a position corresponding to intake phase in FIG. 1.

Figure 6:
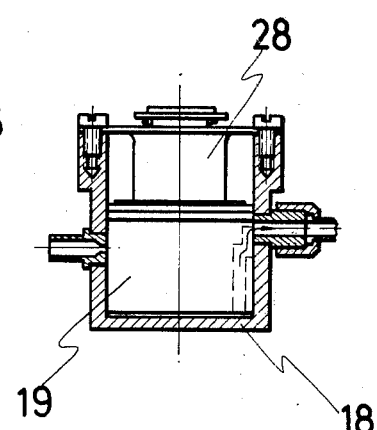

FIG. 6.- Feeder section in FIG. 5 with non-sectioned elevation of internal parts in the combined position they will assume in the phase shown in FIG. 2.

Figure 7:
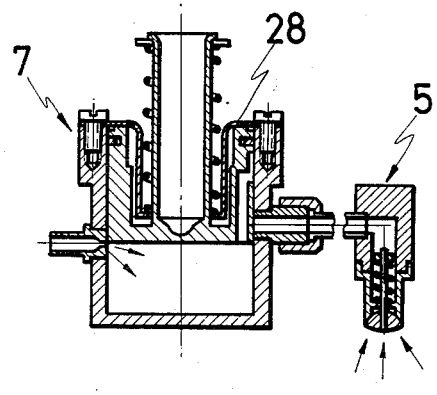

FIG. 7.- Longitudinal section view of the device in FIGS. 5 and 6 during operational phase shown in FIG. 3.

Figure 8:
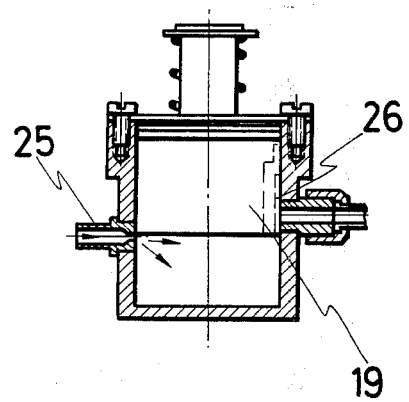

FIG. 8.- Feeder in sections 5, 6 and 7, operating during cycle shown in FIG. 4.

Figure 9:
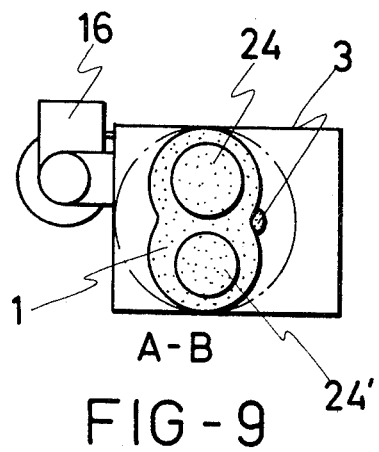

FIG. 9.- Lower plan of cylinder head at stage corresponding to intake phase shown in FIG. 1 (according to A-B, FIG. 2).

FIG. 10.- Cylinder head also in plan view according to operational phase in FIG. 2. This FIG. 10 shows section to which FIGS. 1 to 4 correspond.

Figure 11:
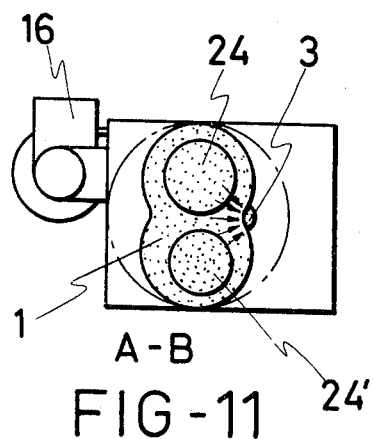

FIG. 11.- Plan of cylinder head at moment of compression shown in FIG. 3.

Figure 12:
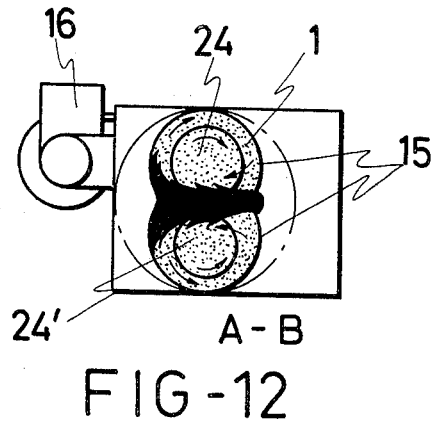

FIG. 12.- View similar to that in FIGS. 9, 10 and 11, in which the cylinder head is shown at moment at which combustion phase begins.

FIG. 13.- Represents a stage analogous to that of combustion shown in FIG. 3 illustrating on an enlarged scale the arrangement of the more characteristic features of the ignition system. Specifically, this involves the precombustion chamber and its preferred manner of execution.

FIG. 14.- Corresponding view when sectioning cylinder head according to plans E-F in the preceding figure.

FIG. 15.- Schematic elevation view of the deflector.

FIG. 16.- Schematically shows a plan view of the deflector.

Figure 18:
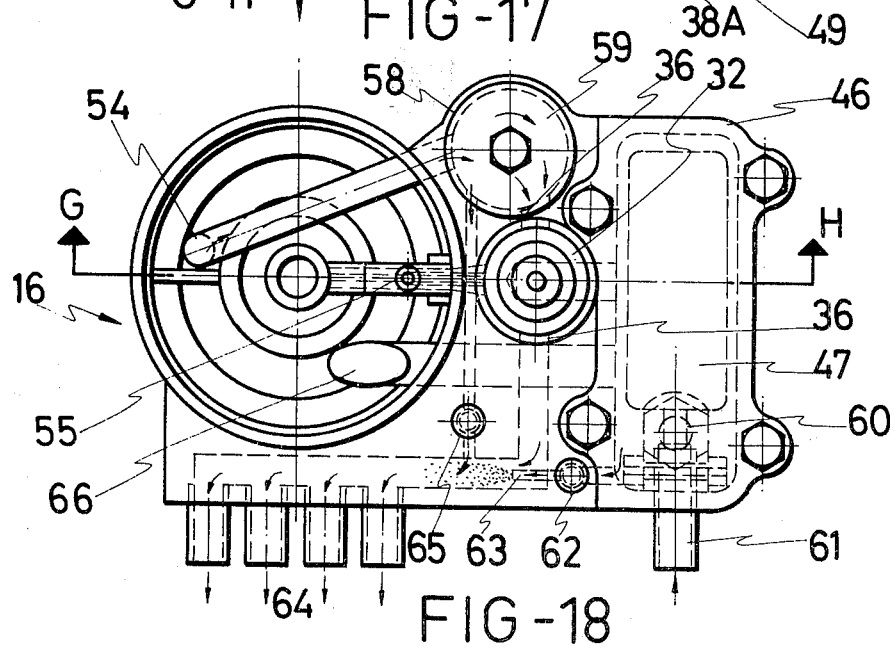

FIG. 17.- Elevation taken from sectioned G-H plan in FIG. 18 corresponding to the carburetor which will distribute the fuel mixture to the principal and precombustion chambers in a synchronized manner.

FIG. 17A.- Enlarged fragmentary elevation corresponding to the elevation shown in FIG. 17 and showing in enlarged detail the structure generally referenced 32.

FIG. 18.- Plan view of carburetor.

Figure 19:
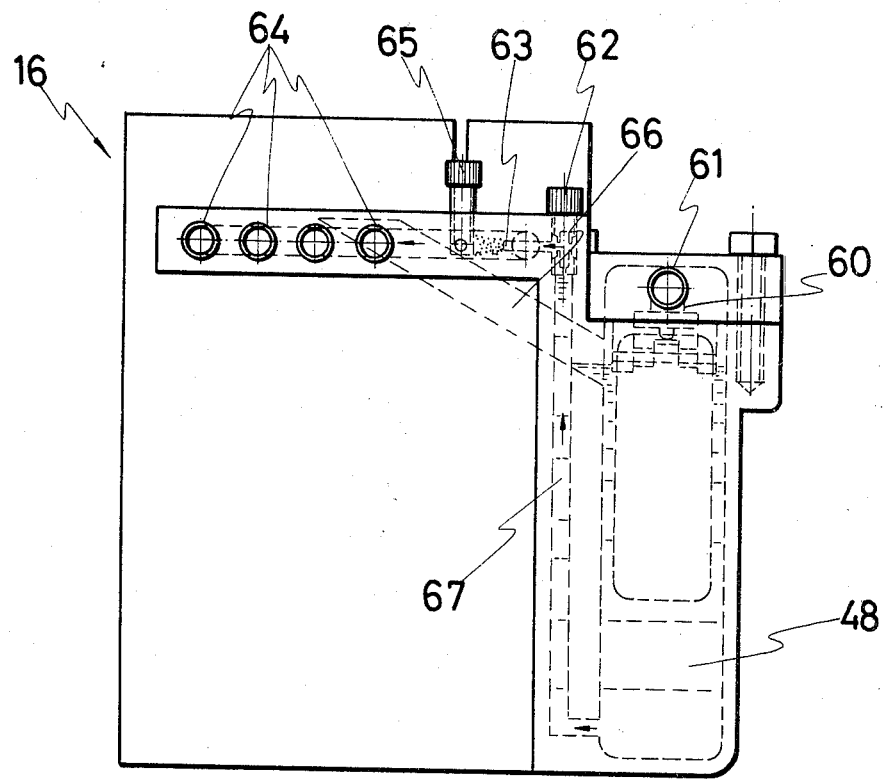

FIG. 19.- Elevation of carburetor showing conduits to feeders in the various compression precombustion chambers for the different cylinders in an engine which in this case are four.

Figure 20:
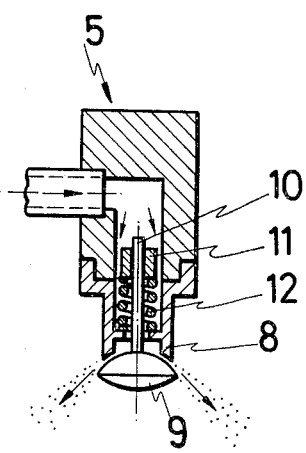

FIG. 20.- Longitudinal section of construction of mixture sprayer for compression precombustion chamber in each cylinder.

Figure 21:
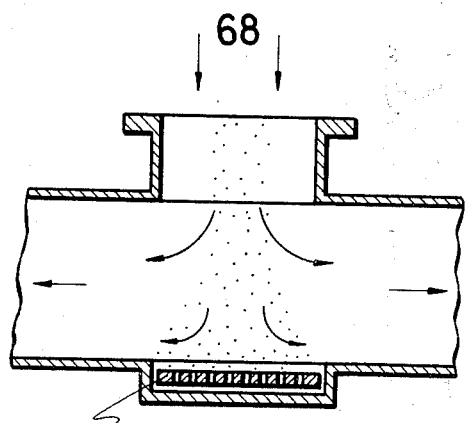

FIG. 21.- Partial section of intake collector for principal compression chambers in the various cylinders on which the carburetor will be placed. Shown in this section are means for heating the fuel mixture prior to passing to the various cylinders; for example, for use during cold weather or when starting the engine.

With respect to said figures and references designating parts and details of the components shown in connection with the purposes of the report, the explanations for the system are as follows:

The compression chamber is subdivided into two parts.

Principal chamber 1 and precombustion chamber 2 which combustion commences, both joined by a gas nozzle 3 aerodynamic section.

The initial combustion is controlled by the following parts: Precombustion chamber 2 which is its principal part, nozzle 3, deflector 4, spray 5 and spark plug 6.

Precombustion chamber 2 has a volume such that its percentage respecting principal chamber 1 represents a fraction thereof with power development equivalent to low engine speed or minimum load; e.g., sufficient to overcome mechanical friction.

The stated precombustion chamber 2 is cleansed of the gases from previous combustion by spraying air/fuel mixture rich in the latter, pressure injected by feeder 7 during exhaust or intake cycle having a flow approximately equivalent to the volume of precombustion chamber 2.

For purposes thereof it has sprayer 5 in the shape shown (it can be shaped otherwise and situated at different points of the precombustion chamber) located at the extreme of the precombustion chamber 2 axis. On its nozzle 8 a sprayer 5 has a spherical retention valve 9 joined to a shaft 10 on the rear control nut 11 of which a spring 12 pushes in the direction of closing the valve.

With regard to the shape of the principal chamber 1 it having optimum operation, this is a dual or 8-shaped lobe into the middle section and on the side of which the inclined extreme of nozzle 3 of the precombustion chamber. Further, piston 13 has a salient 14 shaped like an inclined plane which enters adapting to the principal chamber 1 when piston 13 occupies top dead center. This shape is for the purpose of maintaining rotation of two counter-turning whirlwinds in both lobes 15 even after piston 13 partially descends.

For mixture intake into the engine there is a carburetor 16 which lacks the conventional gas choke valve utilized in quantitative control for, in the system under consideration, the free intake of air or mixture must be allowed without same becoming rarified. In other words, the engine cylinder shall effect loading practically at atmospheric pressure at all engine speeds.

Carburetor 16 feeds two devices for mixture control which will be independent but synchronized to each other, depending on desired engine speed. The former feeds the principal engine intake lacking the stated choke valve, and the latter supplies feeder 7 through conduit 17.

The devices are synchronized in such a way that when the principal carburetor tends to enrich the mixture (increased speed), the auxiliary carburetor device governing the feeder automatically weakens same and vice versa, as will be explained later. Construction and operation of the carburetor will be explained in detail below.

As regards feeder 7, this has a cylinder 18 closed at one end and inside of which there is a piston 19 having one or more segments 20 to seal same, and a driving spring 21.

Piston 19 is displaced by driving rod 22 which in turn connects to control beam 23 of intake valves 24 or exhaust 24' or any of the other drive mechanisms.

Cylinder 18 of feeder 7 has two vents, one 25 for intake, and another 26 for exhaust. The former opens in its entirety when piston 19 occupies top dead center; the latter, when piston 19 almost reaches mid-stroke remains open until its lower dead center and even when the piston again ascends to its former symmetric position.

At time of ignition, piston 19 is always at top dead center, 26 being closed and 25 open.

In order to complete the description of the ignition we may add that:

The most appropriate shape for the precombustion chamber is that of a revolution torus originated by a circle which turns on an axis in the plane thereof and situated at a distance approximately equal to one half of its radius. Nozzle 3 as a constituent part of precombustion chamber 2 is located at the extreme of the stated axis which is common to both.

At the entrance to precombustion chamber 2 and immediately behind nozzle 3 there is a deflector 4 shaped like an inverted cone occupying the same axis of symmetry as precombustion chamber 2 and so situated that at time of compression (FIG. 3) intake of the mixture is diverted into two approximately equal flows: one passes concentrically between the deflector and the wall, brushing the entire precombustion chamber, and there consequently occurring a torustype whirlwind. The other passes through the center of the deflector 4 which, without being diverted, flows according to the torus shaft, colliding against spray cone 5, diverting it and giving rise to another torus shaped vortex but turning counter to the previous one.

Collision of these two torus-shaped vortexes which turn counter, originates neutralizing thereof and creation of new whirlwinds having, however, a small radius, and these turn in all directions.

This effect is extremely important since it prevents centrifugation of the mixture and consequent separation of the fuel from the air due to its greater specific weight, to the precombustion chamber walls. This factor would greatly hamper total combustion.

let us now observe operation of the described arrangement in the four stages corresponding to FIGS. 1 and 4, bearing in mind that FIGS. 5 to 8 and 9 to 12 represent, respectively, what transpires in the feeder and cylinder head at time of the corresponding stage.

FIG. 1 shows the engine at intake, when lever 27 in mid-course acts on intake control beam 23; intake valve 24 and feeder 7 are in similar position by means of rod 22.

At the same time (FIG. 5), piston 19 is in compression and injection position because exhaust vent 26 commences to open. The compressed mixture passes to the sprayer and once at the extreme of the nozzle 8 pushes the automatic retention valve 9 where the mixture is atomized and distributed to the inside of the precombustion chamber 2, cleansing previous combustion gases.

In order to have piston 19 at all times pressing toward lever 27, spring 21 is utilized which rests on the upper end of the piston.

Insofar as cylinder head in FIG. 9, we have already made reference to intake valve 24 and exhaust 24' and to dual lobe shape 15 of the principal chamber 1, in which one end of the nozzle 3 of the ignition exits from the center of one of its sides.

In the stage shown in FIG. 2, the engine, still at intake, lever 27 is already at maximum and piston 19 of feeder 7 at its lower dead center (FIG. 6) where it has just injected the remaining mixture and prepares to ascend and close valve 9 by the depression formed.

FIG. 3 shows the engine at time of compression as it finalizes; lever 27 is displaced, intake valve 24 is closed, and piston 19 of feeder 7 at top dead center (FIG. 7), rests on hood 28.

It will be noted in the cylinder head in FIGS. 3, 11 and 13, that for purposes of compression the mixture is partially displaced to its precombustion chamber where deflector 4 separates the stream in two, an outer one to the funnel and another which passes through the opening of same.

At time of ignition by spark of the mixture in precombustion chamber 2 (FIG. 4), ignition is almost instantaneous, a flame emerging from nozzle 3 to the principal chamber 1 (FIG. 12) which because of its discharge power originates rotation of two counter-turning whirlwinds in two lobes 15 of the stated shape in chamber 1.

FIG. 8 shows piston 19 of feeder 7 in the same position as the previous stage, with safety vent 26 closed.

The features of construction of the various parts of the engine and its objectives having been stated, we will now discuss the assembly in operation: once the mixture is injected into the precombustion chamber, right after the compression stroke effect takes place (FIG. 3), part of the air or air/fuel mixture, depending on status of the engine, respectively at minimum speed or charging, then flows from the principal chamber to the precombustion chamber, causing its rapid entry into same through nozzle 3, which is provided for communication between them until pressure balance is achieved.

This strong turbulence originated by partial intake of air (low speed) dilutes the original rich mixture injected previously into the precombustion chamber to such a point that final air/fuel ratio must be that of maximum or stiochiometric combustion or even slightly in excess of same.

Passage from variability of low engine speed to maximum load is effected by enrichment of principal engine intake by carburetor 16, air intake into the precombustion chamber through nozzle 3 is no longer air only, but is progressively enriched in fuel to a maximum which can be equal to stiochiometric ratio, this point coinciding with quantitative control.

Specifically, this progressive fuel enrichment of air intake is synchronized by continuous weakening in fuel mixture governed by an auxiliary device from carburetor 16 to the feeder, in order to achieve in the precombustion chamber and at all times during control, a mixture resulting from maximum combustibility. Carburetor 16 and its auxiliary devices will be explained below.

This occurs practically at time of maximum compression or top dead center of piston 13 (FIG. 4), when due to prevailing turbulence, ignition spark 6 in the precombustion chamber causes its very rapid ignition, pressure rising immediately, almost instantaneously, in the entire precombustion chamber 2. This is when the burning gases seek pressure balances; they are ejected at supersonic speed to principal chamber 1 by nozzle 3, joining both.

The aforesaid effect being fundamental, it gives rise to the difficult ignition of poor fuel mixtures in the principal chamber, since the burning gases, ejected at several Mach speeds, orginate a strong burst of flame which, given its high temperature, heavy ionization and brusque turbulence, evidence increased temperatures in the entire principal chamber, enough to originate its ignition and complete combustion, the combustion period ending at the beginning of the expansion or working stroke.

Operation of the feeder is as follows: In its upward stroke piston 19, impelled by spring 21 originates a depression in its interior; it then opens the mixture intake vent 25 which enters until it is equal to atmospheric pressure (FIG. 7).

When beam 23 or its control again functions (FIGS. 1 and 5), piston 19 descends, the compression stroke begins, and at mid-stroke, exhaust vent 26 contacts, giving rise to a sudden release of the mixture which, passing through the pertinent conduit, reaches sprayer 5 where it opens the automatic retention valve 9 and is immediately sprayed by the interior nozzle 8 to the precombustion chamber, in turn sweeping away previously burned gases, until the piston completes its stroke at lower dead center (FIG. 6).

When piston 19 again ascends, the depression formed inside the cylinder closes the automatic retention valve 9, preventing return of the mixture and later, high compression pressures. A new cycle is then begun.

In event of damage to this valve 9 a safety vent 26 closing has been provided when the piston occupies top dead center (FIGS. 7 or 8), any return of high pressures to the interior of the feeder being impossible.

Structure and operation of carburetor 16 is as follows:

Bearing in mind that shown in FIGS. 17 to 19, there is described the carburetor which, differing from those currently known, is based on control of the air/fuel mixture insofar as quality of same. That is to say, by changing the air/fuel proportion, of said quantitative control rather than is usually done by maintaining said comburent-fuel proportion. As has already been stated, it is the function of this carburetor to send mixtures toward the principal and auxiliary compression chambers in a synchronized manner as regards engine revolutions.

Carburetor 16 has float chamber 48 in which as is customary, there is a float 47 governing valve 60 for blocking the fuel reaching said tank through conduit 61 located on cover 46 of the tank. As is known, when the liquid inside tank 48 reaches a certain level, inlet 61 is sealed. Attached to said tank there is the economizer which will control amount of fuel to reach the diffusers through a main nozzle. The mixture is atomized by means of graded arrangement of a group formed preferably by three diffusers referenced 52, 51 and 50, in order ot performance.

These diffusers treat the fuel from the time same reaches the first diffuser 52 which distributes it through its crown 53, sending the fuel peripherally and thus effecting the first atomization, since it mixes with atmospheric air from the outside as indicated by the arrow in FIG. 17, this effect being completed upon passage through the other two diffusers 51 and 50 from where the air/fuel mixture travels through collector 68 (FIG. 21) toward the principal chambers in the various cylinders. By virtue of the foregoing it is evident that this carburetor functions without the customary choke or throttle valve.

In such circumstances it is logical to suppose that there must be means for controlling fuel reaching the diffusers and said means are clustered in a monobloc generically referenced 32, coupled in the aforesaid economizer. These regulating means detailed below ensure the necessary synchronization and quality of mixtures sent to principal chamber 1 and auxiliary or precombustion chamber 2 of each cylinder respectively, whichever the engine speed. In other words, means arranged in the tank simultaneously control principal and secondary carburation.

As noted in FIG. 17, body 32 is axially crossed at its lower half by a needle 38 the conical or pointed end 38A of which plays in the calibrated jet 45 screwed to the bottom of the tank, to which jet the fuel arrives from tank 48 by canal 49. On top of jet 45 there is a part 44 which becomes a guide for needle 38. Note that the fuel which extreme of said needle 38A allows through will go to the tank through passages formed between 44 and 45 in a radial direction, as long as said parts 44 and 45 are peripherally separated from the interior walls of the tank.

The body 32 which is hollow in its upper half, receives a valve composed of a cylinder 34 which after an annular slot is continued as an inverted truncated cone referenced 34A through which there is varied the passage of air indirectly controlling, when the depression varies, the quality of the mixture for the feeder of the auxiliary chamber, that is to say, secondary carburation. This is also due to the fact that atmospheric air absorbed by a depression sound 54 the extreme of which is situated between diffusors 50 and 51 height being controllable, exits at a vent 36 facing body 34 or, rather, to the neck defined by part 34A, constituting the device in inactive position.

It is pertinent to note at this point that needle 38 is affixed to valve 34 and axial thereto, so that vertical movements of this valve are necessarily accompanied by said needle 38. In order to effect said movements upward and downward, a cable 29 has been provided encased in 30 which, crossing a stopper 31 screwed to the opening of body 32, the extreme of said cable 29 is held in place by a screw 35 or any other similar part capable of holding the cable. Between the stopper 31 the valve 34 there is an expansion spring 33 which endeavors to keep valve 34 and, in consequence, needle 38 permanently downward, as shown in FIG. 17. Naturally, in order to change that position which might be defined as corresponding to idling or low speed of the engine, it is necessary to overpower the spring 33 pulling cable 29.

Underneath the seat for part 34A forming body 32, sealed joints 37 have been provided which impede communication of the upper semipart of the assembly with the lower semipart. Behind said separating area the shape of a tube 40 can be seen; needle 38 is inside. The tube has along its side a number of calibrated openings 41 on top of which an annular piston 39 of an elastic nature hugs tube 40. The piston has two annular and concentric lips in its upper part for obturation, and two others, also annular and concentric, their purpose being likewise to obturate and they are in a direction opposite to those already stated. Between the inner lips there are tubes 42 that underneath become part of component 43 affixed to needle 38. In these circumstances it is clear that when the stated needle descends it will be accompanied by the piston 39 which has a radial passage joining the depression and deformation of the upper internal annular lip and tubes 42 to the area remaining above, the selfsame elastic piston becoming filled with fuel; when movement is reversed this area expels the fuel to the first diffusor 52 through a conduit when opened by valve 56.

On the other hand, note that tube 40 bends at the top, opening out on a passage which has its opening in an air jet 55 exposed to the effects of dynamic pressure of the air current.

From the construction and arrangement of the piston 39 it is clear that this part performs a dual function; that is, in its upper part it will act as an acceleration pump when raised by cable 29 traction, while at its lower part it performs as an obturating means when accelerator control furnishes the position of lowest engine speed, there thus being obtained a rapid deceleration or reduction in revolutions.

In combination with the structure stated above, which will impel fuel through the diffusers 50, 51 and 52 to the main chambers of the various cylinders, the means sending mixture to the feeders in the respective precombustion chamber through conduits 64 will act. Said means for feeding to the secondary carburation are constituted starting from the sound 54 proper which transmits the air it absorbs toward filter 59 accessible through cover 58, where said air, passing through valve 34 regulating the depression by reason of its position, passes 36 (see FIG. 18) toward the passage which later is divided into conduits 64. On this course the air encounters small tube 63 from which it suctions fuel, since said small tube 63 is linked to conduit 67 emerging from the bottom of the tank 48 as noted in FIG. 19. Said fuel suction is controlled by jet 62 interposed between 67 and 63 as noted in FIG. 19. What might be defined as a tuning operation for an idling engine is effected by acting on screw 65 which shunts air from filter 59 in a greater or lesser volume without suctioning from conduit 63, the mixture for secondary carburation thus becoming poorer or enriched, always qualitatively.

It is simple to envisage operation of the assembly of organs constituting carburetor 16 under discussion for synchronized transmission of mixture to main chamber 1 and secondary chamber 2 of the various cylinders of an engine; bearing in mind the structure outlined, said operation can be summarized as follows:

Starting from the inclined position in FIG. 17 which corresponds to idling of the engine, it is deduced that when the annular slot of valve 34 faces unloading vent 36 of depression probe 54 the mixture will be poor in fuel. If we now raise valve 34 pulling cable 29, said vent 36 will become partly closed, causing enrichment of the secondary mixture sent through 63 at a time prior to opening of the fuel toward main carburation via jet 45.

When the elastic piston 39 rises, it pumps fuel which forces valve 56 to open, injecting same to diffuser 52 at the same time that needle 38, or rather its sharp extreme 38A, allows passage of the liquid through jet 45. When the fuel level descends inside tube 40, some of the calibrated openings on the side thereof which are underneath piston 39 remain visible and allow passage of air, thus depression diminishes and thereby passage of fuel to main atomizer 52. When ring piston 39 descends, it originates a depression which compels deformation of the upper internal lip of the ring. The ring furnishes intake of fuel from the bottom of the tank through tubes 42.

The depression sound 54 synchronizes quality of the mixture and engine speed naturally in combination with valve 34; e.g., richness of the mixture is automatically selected. Let us suppose, for example, a reduction in the number of engine revolutions resulting from an increased load and without moving accelerator control; rate of main fuel will decrease and with it there will be an increase in the level of the economizer tank, thus originating a richer mixture in the principal carburation. This increases engine turning torque.

Lastly it is pertinent to state that insofar as engine carburation in order to tune synchronizing of the main and secondary feeding syesstems, this is accomplished by acting on body 32, raising or lowering same and leaving it at optimum position, for example by means of a screw not shown.

Application of the qualitative control system for combustion engines affords the following improvements in efficiency with respect to quantitative control:

intake of each engine cylinder is effected practically at atmospheric pressure, therefore, real engine compression ratio is constant at any speed control scheme, a factor which increases thermal yield notably;

when combustion is possible in the area where there is excess air or mixtures poor in fuel, final combustion temperature will be lower than for rich mixtures, causing a higher thermal yield by approximation to the Carnot cycle and there being a lower degrading of heat energy;

ignition advance is less in all engine speeds with a maximum of 10° due in part to real constant compression pressure and on the other to a speedier ignition due to sudden turbulence occasioned by the gases in combustion at supersonic speeds proceeding from the ignition. The lower ignition advance originates a shorter negative idling time for pressures which detracts from effective operation;

the very notable cleansing of exhaust fumes which occurs due to three basic causes and results in less atmospheric contamination:

a. When combustion occurs in the excess air zone, yield thereof is increased, originating exhaust practically free of smoke and carbon oxide CO, this latter being between 0.5 and 0.06%.

b. In qualitative control and for same power produced, average thermal yield of speed is greater as a direct result of less fuel consumption, estimated on the approximate order of 40% less and pollution is therefore reduced.

c. Elimination of metallic lead vapors is exhaust fumes. When operation occurs in the excess air zone, the lead tetraethyl as an antiknock is never reduced to metallic lead and rendered volatile at high combustion temperatures characteristic of quantitative speed control, but rather the final product is lead monoxide Pbo, or litharge, a product which emanates in large particles of dust but which, fortunately, due to its specific weight, quickly decants on the ground, suspension in the air being eliminated as is the case with lead fumes.

When both speed controls are compared, maintaining in both cases equal maximum effective power and feeding having the same fuel octane rating, qualitative control offers greater turbulence which, together with the property of burning poor mixtures in optimum conditions, without speed irregularities, the favorable result is obtained of notably removing the detonation area of the mixture, the improved detonation qualities being utilized in mixtures in the excess air zone. This quality entails for a same compression ratio, the use of low octane content fuel or vice-versa, whichever is preferred, for one and the same octane rating a greater compression ratio of cylinder capacity, giving rise to an increase in effective engine power. This increase in power as a principle for comparison presupposes that it is equal to loss of power through use of a mixture slightly poor in fuel, which effect significantly reduces specific consumption of the fuel and this in the area of maximum effective engine power which is the most unfavorable point in consumption of qualitative control but always less than in the quantitative.

Exhaust fumes in the new control system have lower average temperatures with a heavier flow similar in this sense to those of the Rudolf Diesel combustion cycle, it then being possible to utilize exhaust impulses by means of a turbine and to be expanded at atmospheric pressure, a factor which raises even higher the thermal performance of the engine.

Higher thermal performance of the cycle originates improved use of heat energy of the fuel in mechanical energy, a basic reason for less engine heating and in consequence longer duration.

The characteristics of the invention having been stated in a general manner and with reference to an example of execution, it is recorded that the engine to which same are applied can be manufactured in the manner, sizes and materials considered adequate to the specific use to which they will be put. Said variations, as also those which may be made to features in appearance and organization which affect the essentiality claimed, whereupon uses made of this patent within the stated characteristics with any of said modifications will be none but variations, equally are contained and protected in this registration.

Among these possible variations within the generality of the patent there can be established varied shapes in the principal chamber or precombustion chamber. The sprayer may be situated at other points and the feeder can be replaced by a system for airless fuel injection, although this would entail poorer performance and higher cost.

In other words: the auxiliary carburetor device and feeder may be replaced by any airless fuel injection system, maintaining the amount of same to be injected synchronized in every case to the principal carburetor; e.g., fulfilling the same conditions in the auxiliary carburetor system.

The principal carburetor may likewise be replaced by any of the direct injection systems into the principal or indirect injection into the intake collector of the engine.

The new qualitative control system for ignition and firing is applicable to all four-cycle and two-cycle internal combustion engines, and to all variations of so-called rotary engines.

What is claimed is:

1. In combination, a carburetor and feeder means for an internal combustion engine combustion chamber design having a principal combustion chamber and a precombustion chamber interconnected by a nozzle and having a spray means extending into said precombustion chamber for spraying air/fuel mixture into said precombustion chamber:

said carburetor being adapted to provide separate supplies of air/fuel mixture to said principal and precombustion chambers and to provide individual qualitative control of the air/fuel mixture of each said supply;

said feeder means controlling supply of said precombustion chamber's air/fuel mixture, from said carburetor to said spray means, to a desired time period during the operational cycle of said engine; wherein said carburetor comprises:

a float chamber;

a group of diffusers by way of which said supply of air/fuel mixture for said principal chamber is furnished;

a depression sound;

a regulator means adapted to regulate flow of fuel from said float chamber to said group of diffusers;

a closure valve means attached to said regulator means for operation therewith;

said depression sound having an intake located between said group of diffusers and emerging adjacent said closure valve, said closure valve controlling air flow from said depression sound; and means for supplying fuel from said float chamber to be mixed with air flowing from said depression sound past said closure valve to provide said supply of air/fuel mixture for said precombustion chamber: wherein said regulator means comprises:

a body having a substantially vertical cylindrical chamber therein which is in communication with said float chamber;

a jet means extending across the lower part of said cylindrical chamber; and a needle valve means slideably received in said cylindrical chamber to control fuel flow through said jet means, said closure valve means being coaxially arranged with respect to and attached to said needle valve means for slideable movement therewith in said cylindrical chamber; and said closure valve means comprising:

a valve member slideably received in said cylindrical chamber and having an annular slot adapted to provide for passage of air from said depression sound when said closure valve means is open; said passage of air being at least partially restricted when said valve is moved toward its closed position.

2. The combination of claim 1 wherein said regulator means further comprises:

an economizer tube located in the lower part of said cylindrical chamber above said jet means; and a ring piston in sliding engagement with said cylindrical chamber above said economizer tube;

said economizer tube having in the wall thereof longitudinally extending calibrated openings and said ring piston being adapted to act both as an accelerator pump and as an obturator of the fuel supply from said needle valve means and jet means to said group of diffusers.

3. The combination of claim 2, wherein said ring piston comprises:

two annular resiliently deformable lips at the top on its inside and outside peripheries respectively and directed radially inward and outward respectively; and a further two annular resiliently deformable lips at the bottom similarly arranged to said first mentioned lips;

said ring piston having formed therein openings corresponding to the calibrated opening of said economizer tube and extending from the bottom of said ring piston inwardly to the annular space between the inner of the first mentioned lips and the inner of the further lips.

4. The combination of claim 1 wherein said carburetor further comprises:

a filter to filter air passing along said depression sound to said closure valve means;

said valve member has a truncated cone portion adjacent said slot to control air flow through said closure valve means; and said means for supplying fuel comprises:

a jet to meter fuel from said float chamber; and a conduit to carry said metered fuel from said jet for mixing with said air from said closure valve means.

5. The combination of claim 2 further comprising a passage means and a jet controlling flow through said passage means; wherein said economizer tube is exposed to dynamic pressure of air adjacent the inlet end of said group of diffusers by means of said passage and jet.

6. The combination of claim 2 wherein the space between said ring piston and said closure valve means is sealingly closed and the economizer tube and ring piston are connected by a passage to pass fuel to said group of diffusers.

7. The combination of claim 1 wherein said feeder means comprises:

a body having a cylindrical chamber closed at one end therein;

a spring biased piston sealingly and slideably received in said cylindrical chamber, said biasing being away from the closed end of said chamber; and means forming part of said engine is adapted to reciprocate said spring biased portion in synchronism with operation of said engine.

8. The combination of claim 7 wherein said closed cylinder has two vents, one for intake of air fuel mixture and another for outlet thereof, the intake vent being revealed completely when said spring biased piston is at top dead center, and the outlet vent being revealed when said spring biased piston is between its mid stroke position and its bottom dead center position during both the downward and upward strokes; the arrangement being that said spring biased piston is maintained at top dead center with intake vent open and outlet vent closed at the time of combustion.

* * * * *